151. NUT AND BOLT LOCKS,
  Coupled Nut and Bolt,
    Flexible Washer.

Draftsman.

No. 875,782. PATENTED JAN. 7, 1908.
W. H. COOK.
FAST NUT.
APPLICATION FILED APR. 29, 1907.

Inventor
Walter H. Cook

Witnesses

By E. M. Marble
Attorney

UNITED STATES PATENT OFFICE.

WALTER H. COOK, OF LONDON, ENGLAND.

FAST-NUT.

No. 875,782.  Specification of Letters Patent.  Patented Jan. 7, 1908.

Application filed April 29, 1907. Serial No. 370,953.

*To all whom it may concern:*

Be it known that I, WALTER H. COOK, residing at 60 Aldermanbury, London, England, citizen of England, have invented certain new and useful Improvements in Fast-Nuts, of which the following is a specification, My invention relates to fastnuts, sometimes called lock nuts, and consists in the construction and arrangement of the parts which will be more fully hereinafter described and particularly pointed out in the claims.

One object of my invention is to provide means for locking nuts, bolts, screws, and the like securely together under any circumstances, and to provide a double, self contained washer of new and improved construction, which, when applied to the bolt, and acted upon by the nut, will be flattened to a greater or less extent and force the teeth which are formed in the upper plate thereof directly into the bolt or screw to which it is applied thus securing the upper part of the washer firmly to the bolt.

Another object of my invention is to provide in this fastnut, a double self contained cushion washer, consisting of an upper and lower plate bent so as to have a spring back and open lips, whereby the assembled parts will at all times be under pressure from the spring action of the lower plate when the nut is screwed down.

A further object of my fastnut is to provide a locking device for nuts, bolts, screws, and the like, which shall be cheap in construction, perfect in action and durable.

Figure 1:
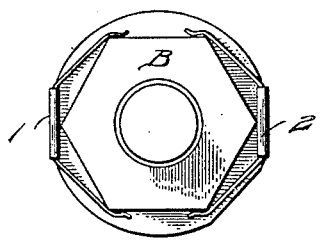
Figure 2:
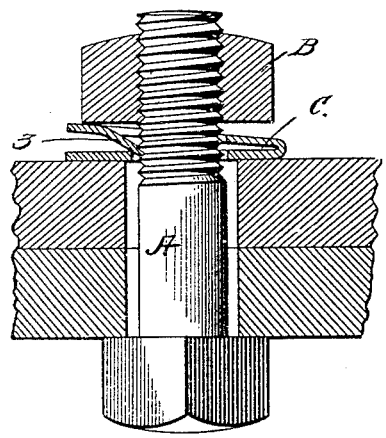
Figure 4:
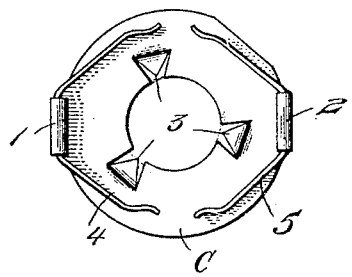
Figure 3:
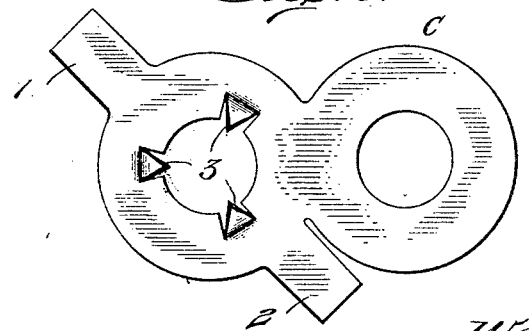

These objects are attained in the structure shown and described in the accompanying drawings forming part of this application as follows: Figure 1 is a top plan view of my improved fastnut washer holding the nut in position by means of the automatic spring arms. Fig. 2 is a side sectional elevation showing the bolt passing through the parts to be secured together in a hole somewhat larger than the bolt, with my double self contained cushion washer in place and partly compressed by the nut on the bolt. Fig. 3 is a plan view of my double self contained automatic cushion washer in a single piece, one part being provided with extensions 1 and 2, and teeth 3. Fig. 4 is a top plan view of the upper washer showing the springs for holding the nut secured thereto to the extension 1 and 2.

Heretofore fastnuts or lock nuts have been constructed in which washers have been used and these washers have been to some extent serviceable, but not satisfactory in all cases. In the fastnut of this invention a washer is used of peculiar construction. A view of this washer as originally struck out or made is shown in Fig. 3. In this figure, one part is provided with teeth which are intended to penetrate the bolt under the pressure which will be given by the lower washer when the nut is screwed down and acts as a cushion and forces the teeth of the upper washer into the bolt and thus holding the upper washer firmly in place. The function of this lower or cushion washer is at all times to press the teeth of the upper washer into position against the bolt preventing them from being broken or worn off by vibration and rubbing and also taking up any space that may occur through wear between the parts assembled.

In Fig. 4, springs 4 and 5 are shown attached to the upper part of the washer by the inclosed extensions 1 and 2 shown in Fig. 3 and said springs act automatically pressing against the sides of the nut with sufficient force to prevent its slacking back through vibration, but allowing the nut to be screwed into place.

In the drawings A represents the bolt, B the nut, and C my double self contained cushion washer in one piece. The bolt and nut are of ordinary construction, but the washer C is of unusual construction, providing means for securing and holding the nut and bolt in their proper places under any circumstances and places where the present known washers will not act.

I do not limit myself to any size of washer of the construction herein shown and described because it is evident that washers of different sizes may be utilized with benefit and advantage.

Having thus described my invention, what I claim and desire to secure by Letters Patent is:—

1. As an article of manufacture, a double self contained automatic cushion washer shown and described in this application having upper and lower sections, both parts provided with apertures and adapted to be located below the nut and the upper plate being provided with teeth for engaging the bolt to hold the washer in place, substantially as described.

2. In a fastnut, the combination with a bolt and nut of a double self contained cushion washer, each part provided with apertures, both parts being adapted to be located below the nut and the upper part being provided with teeth, substantially as described.

3. In a fastnut, the combination of a bolt and nut, a double self contained cushion washer, with central apertures, with teeth in the upper plate of the washer, and spring arms secured thereto by means of the extension pieces 1 and 2 for holding the nut in position, substantially as described.

In testimony whereof I affix my signature, in presence of two witnesses.

WALTER H. COOK.

Witnesses:
T. M. FREEBLE,
BLANCHE L. CHADWELL.